(12) United States Patent  (10) Patent No.: US 9,348,598 B2
Greenhalgh  (45) Date of Patent: May 24, 2016

(54) DATA PROCESSING APPARATUS AND METHOD FOR PRE-DECODING INSTRUCTIONS TO BE EXECUTED BY PROCESSING CIRCUITRY

(71) Applicant: ARM Limited, Cambridge (GB)

(72) Inventor: Peter Richard Greenhalgh, Cambridge (GB)

(73) Assignee: ARM Limited, Cambridge (GB)

( * ) Notice: Subject to any disclaimer, the term of this patent is extended or adjusted under 35 U.S.C. 154(b) by 503 days.

(21) Appl. No.: 13/868,186

(22) Filed: Apr. 23, 2013

(65) Prior Publication Data

US 2014/0317384 A1 Oct. 23, 2014

(51) Int. Cl.
*G06F 9/30* (2006.01)
*G06F 13/00* (2006.01)
*G06F 9/38* (2006.01)
*G06F 12/08* (2016.01)

(52) U.S. Cl.
CPC .............. *G06F 9/3802* (2013.01); *G06F 9/382* (2013.01); *G06F 12/0811* (2013.01)

(58) Field of Classification Search
CPC ........................... G06F 12/0846; G06F 9/3875
See application file for complete search history.

(56) References Cited

U.S. PATENT DOCUMENTS

| | | | |
|---|---|---|---|
| 6,038,693 A | 3/2000 | Zhang | |
| 6,092,182 A | 7/2000 | Mahalingaiah | |
| 6,367,006 B1 * | 4/2002 | Tran ................... | G06F 9/30152 712/244 |
| 6,606,686 B1 * | 8/2003 | Agarwala ............ | G06F 12/0846 711/122 |
| 6,804,799 B2 | 10/2004 | Zuraski, Jr. | |
| 7,827,355 B1 | 11/2010 | Muthusamy et al. | |
| 2002/0199151 A1 | 12/2002 | Zuraski, Jr. | |
| 2007/0204121 A1 * | 8/2007 | O'Connor ............. | G06F 12/126 711/163 |
| 2007/0260854 A1 | 11/2007 | Smith et al. | |
| 2008/0148089 A1 | 6/2008 | Luick | |
| 2008/0256338 A1 | 10/2008 | Suggs | |
| 2010/0017580 A1 | 1/2010 | Greenhalgh et al. | |
| 2010/0064181 A1 * | 3/2010 | Moyer ................ | G06F 11/1064 714/48 |
| 2010/0169615 A1 | 7/2010 | Sartorius et al. | |
| 2014/0089598 A1 * | 3/2014 | DeBruyne ........... | G06F 9/30149 711/140 |

FOREIGN PATENT DOCUMENTS

WO WO 2008/124473 10/2008

OTHER PUBLICATIONS

AMD K5 Processor Data Sheet—Preliminary Information, *AMD*, Sep. 1996, 95 pgs.

(Continued)

*Primary Examiner* — Hyun Nam
(74) *Attorney, Agent, or Firm* — Nixon & Vanderhye P.C.

(57) ABSTRACT

A hierarchical cache with at least a unified cache is used to store both instructions and data values, and a further cache coupled between processing circuitry and a unified cache. The unified cache has a plurality of cache lines identified as an instruction cache line or a data cache line. Each data cache line stores at least one data value and the associated information. Pre-decode circuitry is associated with the unified cache and performs a first pre-decode operation on a received instruction for that instruction cache line in order to generate a corresponding partially pre-decoded instruction for storing in the instruction cache line. Further pre-decode circuitry is associated with the further cache, and, when a partially pre-decoded instruction is routed to the further cache, performs a further pre-decode operation on the partially pre-decoded instruction to generate a corresponding pre-decoded instruction for storage in the further cache.

17 Claims, 9 Drawing Sheets

P.D ≡ INITIAL PREDECODE BITS PRODUCED BY FIRST STAGE PREDECODE
F.P.D ≡ FULL PREDECODE BITS AVAILABLE AFTER FURTHER STAGE PREDECODE

(56) References Cited

OTHER PUBLICATIONS

Intrater et al., "Performance Evaluation of a Decoded Instruction Cache for Variable Instruction Length Computers", *IEEE Transactions on Computers*, vol. 43, No. 10, Oct. 1994, pp. 1140-1150.

Widdoes, Jr., "The S-1 Project: Developing High-Performance Digital Computers", *IEEE Computer Society*, Dec. 11, 1979, 12 pgs.

M. Smotherman, [Online] "Livermore S-1 Supercomputer—A Short History", http://www.cs.clemson.edu/~mark/s1.html, last updated May 2006, 10 pgs.

* cited by examiner

DATA PROCESSING APPARATUS AND METHOD FOR PRE-DECODING INSTRUCTIONS TO BE EXECUTED BY PROCESSING CIRCUITRY

BACKGROUND

The present invention relates to a data processing apparatus and method for pre-decoding instructions to be executed by processing circuitry within the data processing apparatus.

It is typically the case that one or more caches are provided within a data processing apparatus for caching the instructions and data required by processing circuitry within the data processing apparatus. At any particular level in a cache hierarchy, separate instruction and data caches may be provided (often referred to as a Harvard architecture), or alternatively a unified cache may be provided for storing the instructions and data (often referred to as a Von Neumann architecture). When instructions are fetched from memory for storing in a cache, some known systems have employed pre-decoding mechanisms for performance orientated reasons. In accordance with such mechanisms, instructions are pre-decoded prior to storing in a particular level of the cache (typically the level 1 cache), and in such cases that level of the cache often then stores instructions in a wider format than the instructions stored in main memory, to accommodate the additional information produced by the pre-decoding process. To assist in improving performance when the instructions are later decoded and executed, the extra information provided in the pre-decoded instructions as stored in the cache has been used to identify branch instructions, identify classes of instructions (e.g. load/store instructions, coprocessor instructions, etc) to later assist multi-issue circuitry in dispatching particular instructions to particular execution pipelines, and to identify instruction boundaries in variable length instruction sets.

For example, the article "Performance Evaluation Of A Decoded Instruction Cache For Variable Instruction Length Computers", IEEE Transactions on Computers, Volume 43, number 10, pages 1140 to 1150, October 1994, by G Intrater et al., discusses the storing of pre-decoded instructions in a cache. The article "The S-1 Project: Developing High-Performance Digital Computers" by L. Curtis Widdoes, Jr., Lawrence Livermore National Laboratory, 11 Dec. 1979, describes the S1 Mark IIA computer, where a decoded instruction cache expanded the 36-bit instruction word to a 56-bit instruction cache format to reduce instruction decoding time (see also the paper "Livermore S-1 Supercomputer—A Short History" appearing on the website http://www.cs.clemson.edu/~mark/s1.html). Further, the idea of using pre-decoding mechanisms to pre-identify branches and pre-identify instruction boundaries is discussed in the AMD K5 Processor Data sheet, Publication no. 18522E-0, September 1996, Section 4.5, Innovative x86 Instruction Pre-decoding, page 6, which discusses adding 4 bits per instruction byte to identify start, end, opcode position, and number of Rops (RISC operations) the individual x86 instruction requires for later translation.

Commonly owned US patent publication US 2010/0017580 describes an apparatus including pre-decoding circuitry for performing a pre-decoding operation on instructions fetched from memory in order to generate corresponding pre-decoded instructions for storing in a cache. In one embodiment, the pre-decoding circuitry is provided in association with a level 1 instruction cache. However, in an alternative embodiment, the pre-decoding circuitry is instead associated with a unified cache storing both instructions and data, for example a level 2 cache.

U.S. Pat. Nos. 6,092,182 and 6,804,799 describe a pre-decode unit associated with a level 1 instruction cache, which is configured to receive instruction bytes from a level 2 cache and to generate corresponding pre-decode information for storing in the level 1 cache in association with the instruction bytes. When such instruction bytes and corresponding pre-decode information is subsequently evicted from the level 1 instruction cache, the level 1 instruction cache is configured to output at least part of the corresponding pre-decode information for storage in the level 2 cache. The pre-decode information may be stored in storage locations within the level 2 cache that are configured to store parity and/or error checking and correction information.

In many implementations, significant power consumption may be associated with performance of such pre-decoding operations, and furthermore such pre-decoding operations can impact performance. Accordingly, it would be desirable to provide a mechanism for performing such pre-decoding operations, which enabled a reduction in power consumption and/or an improvement in performance.

SUMMARY

Viewed from a first aspect, the present invention provides a data processing apparatus comprising: processing circuitry configured to execute instructions fetched from memory in order to perform processing operations on data values; a hierarchical cache structure configured to store the instructions fetched from said memory for access by the processing circuitry, the hierarchical cache structure comprising at least a unified cache configured to store both instructions and data values and a further cache coupled between the processing circuitry and the unified cache; the unified cache having a plurality of cache lines, each cache line being identified as an instruction cache line or a data cache line and each cache line having an associated information portion; each data cache line being configured to store at least one data value and the associated information portion being configured to store error correction code (ECC) data used for error detection and correction within that data cache line's stored content; pre-decode circuitry associated with the unified cache and configured, for each instruction cache line, to perform a first pre-decode operation on at least one received instruction for that instruction cache line in order to generate at least one partially pre-decoded instruction for storing in that instruction cache line, each at least one partially pre-decoded instruction having more bits than the corresponding received instruction and the unified cache being configured to use the instruction cache line in combination with its associated information portion to store said at least one partially pre-decoded instruction generated by the pre-decode circuitry; and further pre-decode circuitry associated with said further cache, and configured when the at least one partially pre-decoded instruction stored in one of said instruction cache lines is routed to the further cache for storage within at least one cache line of the further cache, to perform a further pre-decode operation on the at least one partially pre-decoded instruction in order to generate a corresponding at least one pre-decoded instruction for storage in the further cache.

In contrast to the prior art where pre-decoding is performed in association with one particular cache level, typically in association with the level one cache, the technique of the present invention provides a multi-level pre-decoding mechanism. In particular, pre-decode circuitry is associated with a unified cache and configured to perform a first pre-decode operation on receipt of instructions for storing in that unified cache. Performance of the first pre-decode operation results in at least one partially pre-decoded instruction for storing in an instruction cache line of the unified cache, where each partially pre-decoded instruction has more bits than the corresponding received instruction, and the unified cache accommodates those extra bits by using the information portion associated with the instruction cache line. In particular, that associated information portion is typically used to store error correction code (ECC) data when data values are stored within a cache line of the unified cache, but such ECC information is not needed in association with instructions stored within the unified cache, since the instructions will not be dirty (i.e. different to the version stored in memory), and accordingly those instructions can always be retrieved from memory if needed.

The space available within the associated information portion for accommodating additional bits generated by the first pre-decode operation will typically be insufficient to store all of the necessary pre-decode information required by the processing circuitry. Accordingly, the pre-decode circuitry associated with the unified cache generates a partially pre-decoded instruction, and the present invention additionally provides further pre-decode circuitry associated with a further cache coupled between the processing circuitry and the unified cache, that further pre-decode circuitry performing a further pre-decode operation on a partially pre-decoded instruction retrieved from the unified cache in order to generate a corresponding pre-decoded instruction for storing in the further cache.

This multi-level pre-decode mechanism provides a number of power and performance benefits. In particular, if a cache miss occurs in the further cache, but the requested instruction is available in the unified cache, that requested instruction will already have been partially pre-decoded prior to storing within the unified cache, and accordingly only the necessary additional pre-decoding needs to be performed by the further pre-decode circuitry, thereby significantly reducing the latency involved when transferring an instruction from the unified cache to the further cache following a cache hit in the unified cache. This also gives rise to a significant power consumption reduction, due to the reduced amount of processing that needs to be performed by the further pre-decode circuitry in such a situation. These savings are significant, since it is often the case that an instruction request that misses in the further cache will result in a hit in the unified cache. Purely by way of example, in an embodiment where the further cache is a level one instruction cache, and the unified cache is a level two cache, many practical implementations get hit rates in the region of 50% in the level two cache following a miss in the level one cache, and every time that scenario arises, the technique of the present invention will give significant performance and power consumption savings compared with an implementation where all of the pre-decoding is performed in association with the level one cache.

In addition to the above benefits, the multi-level pre-decoding mechanism of the present invention takes advantage of available space within the unified cache to ensure that the amount of pre-decode information generated by performance of the first pre-decode operation by the pre-decode circuitry associated with the unified cache can be accommodated within that available space. The pre-decode information generated by performance of the first pre-decode operation will be chosen accordingly, with the further pre-decode circuitry associated with the further cache then performing the additional pre-decoding required in order to produce the pre-decoded instruction for storing within the further cache.

In one embodiment, for each instruction cache line the associated information portion is configured to additionally store parity data used for error detection within that instruction cache line's stored content, the parity data comprising less bits than the ECC data. By storing the parity data, it is possible to detect an error in the instruction cache line's stored content, and upon detection of such an error the contents of the instruction cache line can be discarded and refetched from a lower level of the memory hierarchy or from memory.

In one embodiment, the parity data comprises m less bits than the ECC data, and the at least one partially pre-decoded instruction generated by the pre-decode circuitry has up to m more bits than the corresponding at least one instruction received by the pre-decode circuitry. Hence, in this embodiment, the first pre-decode operation performed by the pre-decode circuitry is chosen so as to generate up to (but no more than) m additional bits when compared with the corresponding received instruction(s), hence enabling the partially pre-decoded instruction to be accommodated within the unified cache without any modification to the structure of the unified cache.

The partially pre-decoded instruction can take a variety of forms. However, in one embodiment, the pre-decode circuitry is configured to modify at least one of the bit values of each received instruction when generating the corresponding partially pre-decoded instruction. Hence, in such an embodiment, the originally received instruction is itself modified when generating the partially pre-decoded instruction. There are a number of ways in which the received instruction can be modified, and in one particular example the opcode of the originally received instruction is modified by virtue of the additional information generated when creating the partially pre-decoded instruction.

Similarly, in one embodiment, the further pre-decode circuitry may be configured to modify at least one of the bit values of each partially pre-decoded instruction when generating the corresponding pre-decoded instruction.

In an alternative embodiment, performance of the first pre-decode operation does not itself modify the originally received instruction but instead generates first pre-decode information to be associated with each received instruction. In such an embodiment, each partially pre-decoded instruction generated by the pre-decode circuitry hence comprises the originally received instruction in combination with the first pre-decode information.

Similarly, in one embodiment, the further pre-decode circuitry is configured, for each partially pre-decoded instruction, to generate further pre-decode information based on at least the first pre-decode information of that partially pre-decoded instruction.

The relationship between the first pre-decode information and the further pre-decode information will vary dependent on embodiment. For example, in one embodiment, each pre-decoded instruction generated by the further pre-decode circuitry comprises the original received instruction and both the first pre-decode information and the further pre-decode information. Hence, in such embodiments, the further pre-decode information supplements the first pre-decode information, and both pieces of pre-decode information are retained within the pre-decoded instruction stored within the further cache.

However, in an alternative embodiment the further pre-decode information generated by the further pre-decode circuitry replaces the first pre-decode information and each pre-decoded instruction generated by the further pre-decode circuitry comprises the original received instruction and the further pre-decode information. Hence, in such embodiments, the first pre-decode information may merely be information that enables the further pre-decode circuitry to more efficiently generate the further pre-decode information, but the first pre-decode information is not itself retained within the pre-decoded instruction stored within the further cache.

Whilst in one embodiment it may be predetermined which cache lines within the unified cache are instruction cache lines and which ones are data cache lines, in another embodiment each cache line can be configured to be either an instruction cache line or a data cache line during use, and indeed how each individual cache line is used may vary over time. In one particular embodiment, each cache line in the unified cache has an identifier field associated therewith whose value is set in order to identify whether the associated cache line is an instruction cache line or a data cache line. Accordingly, in such embodiments, whenever a linefill operation is used to store new content into a particular cache line, the identifier field will be set accordingly to identify whether that content identifies instructions or data.

The unified cache and the further cache may be any appropriate caches within the hierarchical cache structure. However, in one embodiment the unified cache is a level two cache and the further cache is a level one cache.

Further, whilst the multi-level pre-decoding mechanism may be applied only in respect of two cache levels, the technique can be extended to more than two cache levels, with each further cache level performing some further pre-decoding of the pre-decoded instruction information retrieved from the lower cache level (i.e. a cache level more remote from the processing circuitry).

The further cache may itself be a unified cache, or instead may be solely an instruction cache. In one embodiment, the further cache is solely an instruction cache, and hence is configured to store instructions but not data values.

Some systems support self-modifying code, where an instruction may be modified by the processing circuitry and written out as data to memory. The modified instruction can then subsequently be retrieved from memory. In one embodiment, the multi-level pre-decoding mechanism of the present invention is configured to support use of self-modifying code. In particular, in one embodiment, each cache line in the unified cache has an address field associated therewith used to identify a memory address associated with the instructions or data values stored in that cache line, at least some instructions are modifiable by the processing circuitry and output as data for storage in the memory, and each request for an instruction issued by the processing circuitry is accompanied by an address identifier used to identify the memory address of the instruction being requested. The unified cache is configured, if no instruction cache line stores a copy of the requested instruction, to also check each data cache line to determine whether the address identifier for the requested instruction matches with the address field of any of the data cache lines, and upon such a match to perform a predetermined operation to output the requested instruction for provision to the processing circuitry. Hence, in such embodiments, if no instruction cache line in the unified cache stores a copy of the requested instruction, the unified cache also checks each data cache line, and if a match is detected with respect to one of the data cache lines, a predetermined operation is instigated in order to enable the unified cache to provide the requested instruction to the processing circuitry.

That predetermined operation can take a variety of forms. However, in one embodiment, the predetermined operation comprises flushing from the unified cache the content of the data cache line producing said match, performing a linefill operation to cause that flushed content to be retrieved via the pre-decode circuitry and the resultant generated at least one partially pre-decoded instruction to be stored into one of said instruction cache lines, and outputting the partially pre-decoded instruction corresponding to the requested instruction.

However, in an alternative embodiment, in order to further improve performance, the predetermined operation comprises reading from the unified cache the content of the data cache line producing said match, routing that content to the pre-decode circuitry to cause the first pre-decode operation to be applied to that content, storing the resultant at least one partially pre-decoded instruction generated by the pre-decode circuitry in one of said instruction cache lines, and outputting the partially pre-decoded instruction corresponding to the requested instruction. This reduces latency when compared with the other approach of flushing to, and refetching from, memory.

Viewed from a second aspect, the present invention provides a method of pre-decoding instructions within a data processing apparatus having processing circuitry for executing instructions fetched from memory in order to perform processing operations on data values, and a hierarchical cache structure for storing the instructions fetched from said memory for access by the processing circuitry, the hierarchical cache structure comprising at least a unified cache configured to store both instructions and data values and a further cache coupled between the processing circuitry and the unified cache, the unified cache having a plurality of cache lines, each cache line being identified as an instruction cache line or a data cache line and each cache line having an associated information portion, the method comprising: storing within each data cache line at least one data value and storing within the associated information portion error correction code (ECC) data used for error detection and correction within that data cache line's stored content; employing pre-decode circuitry associated with the unified cache, for each instruction cache line, to perform a first pre-decode operation on at least one received instruction for that instruction cache line in order to generate at least one partially pre-decoded instruction for storing in that instruction cache line, each at least one partially pre-decoded instruction having more bits than the corresponding received instruction and the unified cache being configured to use the instruction cache line in combination with its associated information portion to store said at least one partially pre-decoded instruction generated by the pre-decode circuitry; and employing further pre-decode circuitry associated with said further cache, when the at least one partially pre-decoded instruction stored in one of said instruction cache lines is routed to the further cache for storage within at least one cache line of the further cache, to perform a further pre-decode operation on the at least one partially pre-decoded instruction in order to generate a corresponding at least one pre-decoded instruction for storage in the further cache.

Viewed from a third aspect, the present invention provides a data processing apparatus comprising: processing means for executing instructions fetched from memory in order to perform processing operations on data values; a hierarchical cache structure means for storing the instructions fetched from said memory for access by the processing means, the hierarchical cache structure means comprising at least a unified cache means for storing both instructions and data values and a further cache means coupled between the processing means and the unified cache means; the unified cache means having a plurality of cache lines, each cache line being identified as an instruction cache line or a data cache line and each cache line having an associated information portion; each data cache line for storing at least one data value and the associated information portion for storing error correction code (ECC) data used for error detection and correction within that data cache line's stored content; pre-decode means associated with the unified cache means for performing, for each instruction cache line, a first pre-decode operation on at least one received instruction for that instruction cache line in order to generate at least one partially pre-decoded instruction for storing in that instruction cache line, each at least one partially pre-decoded instruction having more bits than the corresponding received instruction and the unified cache means using the instruction cache line in combination with its associated information portion to store said at least one partially pre-decoded instruction generated by the pre-decode means; and further pre-decode means associated with said further cache for performing, when the at least one partially pre-decoded instruction stored in one of said instruction cache lines is routed to the further cache means for storage within at least one cache line of the further cache means, a further pre-decode operation on the at least one partially pre-decoded instruction in order to generate a corresponding at least one pre-decoded instruction for storage in the further cache means.

BRIEF DESCRIPTION OF THE DRAWINGS

The present invention will be described further, by way of example only, with reference to embodiments as illustrated in the accompanying drawings, in which.

DESCRIPTION OF EXAMPLE EMBODIMENTS

Figure 1:
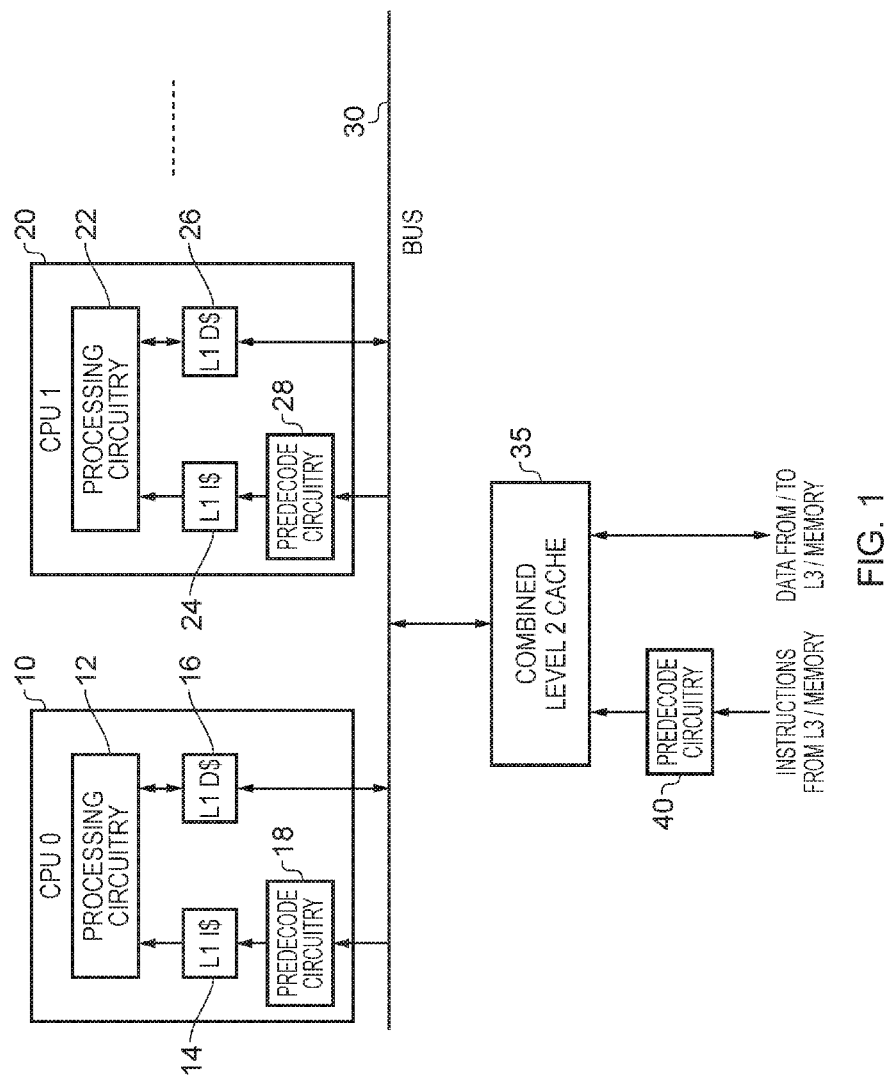
FIG. 1 is a block diagram of a data processing apparatus in accordance with one embodiment.

FIG. 1 is a block diagram of a data processing apparatus in accordance with one embodiment. In accordance with this embodiment, multiple processor devices 10, 20, etc, are provided, in the illustrated embodiment each processor device taking the form of a central processing unit (CPU).

Each processor device has processing circuitry arranged to execute instructions fetched from memory in order to perform processing operations on data values, and is provided with a level one instruction cache for storing instructions fetched from memory, and a level one data cache for storing data values for access by the processing circuitry when executing the instructions. Hence, CPU 0 10 has processing circuitry 12 coupled to a level one instruction cache 14 and a level one data cache 16. Similarly, CPU 1 20 has processing circuitry 22 coupled to a level one instruction cache 24 and a level one data cache 26.

In accordance with the described embodiment, each level one instruction cache 14, 24 has associated pre-decode circuitry 18, 28 for performing a further pre-decode operation on already partially pre-decoded instructions retrieved via the bus 30 from the combined level two cache 35. The combined level two cache 35 is a unified cache for storing both instructions and data values, and has pre-decode circuitry 40 associated therewith for performing a first pre-decode operation on instructions retrieved from a lower level of the memory hierarchy or from memory. In particular, when one or more instructions are retrieved from the lower level of the memory hierarchy or from memory for storing into an allocated cache line of the level two cache 35, the pre-decode circuitry 40 performs a first pre-decode operation on each received instruction in order to generate a corresponding partially pre-decoded instruction for storing in the instruction cache line. Each partially pre-decoded instruction may be a modified version of the originally received instruction, for example by modification of the opcode, or may actually consist of the originally received instruction along with some associated first pre-decode information generated by the pre-decode circuitry 40, with the original instruction in combination with that first pre-decode information collectively forming the partially pre-decoded instruction.

As each partially pre-decoded instruction is retrieved from the level two cache 35 into one of the level one instruction caches 14, 24, the corresponding pre-decode circuitry 18, 28 performs a further pre-decode operation on that partially pre-decoded instruction in order to generate a corresponding pre-decoded instruction for storage in the level one cache. In particular, the output of the pre-decode circuitry 18 or 28 will be a fully pre-decoded instruction which is stored in the level one instruction cache for subsequent provision to the processing circuitry 12. Each pre-decoded instruction retrieved by the processing circuitry 12, 22 will then be decoded prior to issue to an appropriate execution path within the processing circuitry.

Figure 2:
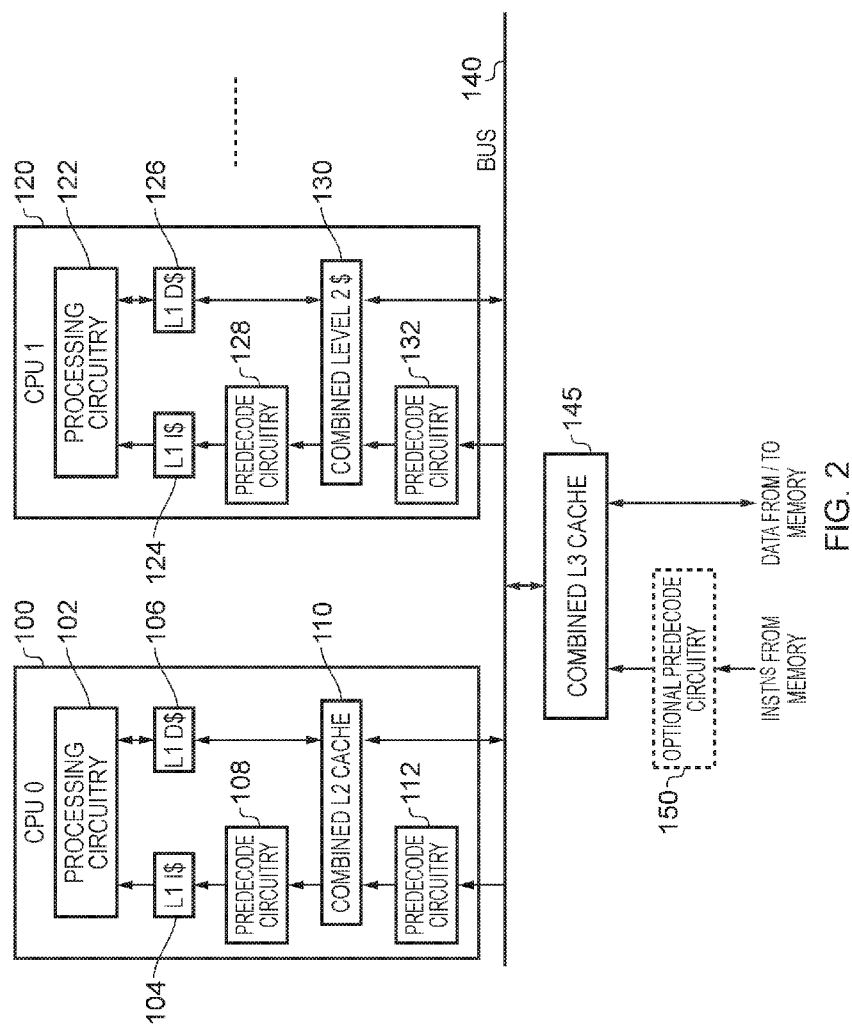
FIG. 2 is a block diagram of a data processing apparatus in accordance with an alternative embodiment.

In FIG. 1, the combined level two cache 35 is shared between the multiple processing devices 10, 20. FIG. 2 shows an alternative embodiment where each processing device includes a combined level two cache. Hence, the CPU 0 100 includes processing circuitry 102, a level one instruction cache 104, a level one data cache 106 and pre-decode circuitry 108 associated with the level one instruction cache 104, these components corresponding with the components 12, 14, 16, 18 shown in FIG. 1. However, in addition, a combined level two cache 110 is provided within the CPU 0 100, along with its associated pre-decode circuitry 112.

Similarly, the CPU 1 120 includes processing circuitry 122, a level one instruction cache 124 and associated pre-decode circuitry 128, a level one data cache 126, a combined level two cache 130 and associated pre-decode circuitry 132 for that combined level two cache.

In this embodiment, each of the processing devices 100, 120 is coupled via a bus 140 to a combined level three cache 145, which in turn is coupled to main memory.

In one embodiment, the pre-decode circuits 112, 132 associated with the combined level two caches 110, 130, respectively, may perform the first pre-decode operation in order to generate partially pre-decoded instructions, with the pre-decode circuits 108, 128 associated with the level one instruction caches 104, 124 then performing the further pre-decode operation in order to generate fully pre-decoded instructions for storage within the level one instruction cache. However, whilst in one embodiment the multi-stage pre-decode mechanism may a two-stage mechanism as described above, it can also be extended to further levels. Accordingly, by way of example, the optional pre-decode circuitry 150 may be associated with the combined level three cache 145 in order to allow the apparatus to implement a three-stage pre-decode mechanism. Hence, in this embodiment, the pre-decode circuitry 150 will perform the initial pre-decode operation, in order to generate partially pre-decoded instructions to be stored within the level three cache 145. As each partially pre-decoded instruction is then retrieved into one of the level two caches 110, 130, the associated pre-decode circuitry 112, 132 will perform a further pre-decode operation in order to produce a revised partially pre-decoded instruction for storing in the level two cache. Then, when the revised partially pre-decoded instruction is retrieved from the level two cache 110, 130 into the relevant level one instruction cache 104, 124, the associated pre-decode circuitry 108, 128 will perform the final stage of pre-decoding in order to generate the fully pre-decoded instruction for storing in the level one instruction cache.

Whilst in the above described embodiments, the final stage of the pre-decode operation is associated with the level one instruction cache, this is not essential, and the final stage may be associated with a lower level of the cache hierarchy. For example, the pre-decode circuitry 150 could perform an initial stage of pre-decoding, with the pre-decode circuits 112, 132 then providing the final stage of pre-decoding. In such an embodiment, the pre-decode circuits 108, 128 would not be required.

Figure 3:
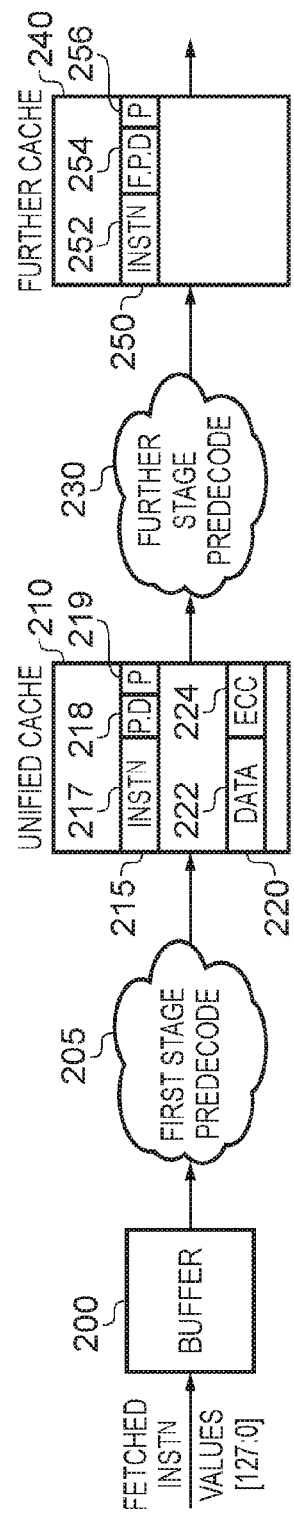
FIG. 3 schematically illustrates the multi-stage pre-decode mechanism employed in accordance with one embodiment.

FIG. 3 schematically illustrates the multi-stage pre-decode mechanism used in one embodiment. In this embodiment, blocks of instruction values representing multiple instructions are fetched into a buffer 200, in the particular example shown it being assumed that four 32-bit instructions are fetched as a block and stored within the buffer 200. The block size is typically determined having regards to the size of a cache line within the unified cache, and in one embodiment each cache line is configured to store a multiple of the fetched block size. In one particular embodiment each cache line is configured to store sixteen 32-bit instructions.

Each block of fetched instruction values is passed through a first stage pre-decode mechanism 205 in order to generate a corresponding sequence of partially pre-decoded instructions for storing within the unified cache 210. FIG. 3 schematically illustrates the cache lines within the unified cache 210, each cache line having a section for storing instructions or data values, and an associated information portion for storing related data. Considering a cache line marked as a data cache line 220, the section 222 will hence store a plurality of data values, whilst the information portion 224 will typically store error correction code (ECC) data used for error detection and correction within that data cache line's stored content. ECC detection and correction techniques will be well understood by those skilled in the art, and accordingly will not be discussed further herein.

For instructions fetched from memory, it is typically not necessary to store ECC data, since the instruction values stored within an instruction cache line will merely be copies of the instructions stored within memory, and accordingly if there is any detected error in the stored instruction data, it can merely be discarded and refetched from memory. Accordingly, in one embodiment, parity data 219 is instead stored in association with each instruction cache line in order to enable detection of an error in the content of that instruction cache line. Whilst the parity data can enable an error to be detected, it does not enable any correction of the error, and instead the cache line's contents are merely discarded and refetched from memory in the event of an error being detected.

Since for an instruction cache line, parity data (typically a single parity bit) is stored instead of ECC data, not all of the information portion associated with any cache line allocated as an instruction cache line within the unified cache will be used. In accordance with one embodiment, this available space is used to store the extra bits generated as a result of the first pre-decode operation performed by the first stage pre-decode block 205. In particular, each partially pre-decoded instruction will have more bits than the corresponding received instruction stored in the buffer 200, and as a result the standard cache line section used to store instructions and data values will not be sufficiently large to store the corresponding partially pre-decoded instructions. However, the unused space in the associated information portion can be used to accommodate this information. Purely by way of illustration, in FIG. 3 it is assumed that each partially pre-decoded instruction includes the original instruction and associated first pre-decode information. In that configuration, the original instructions can be stored within the section 217, whilst the corresponding first pre-decode information is stored within the section 218 provided by the unused part of the information portion of that cache line. More generally, it does not matter which parts of the instruction cache line and associated information portion are used to store the instructions and associated first pre-decode information. The only constraint is that the first stage pre-decode block does not produce more additional bits of information than can be accommodated within the unused part of the cache line's associated information portion.

The space available within the associated information portion for accommodating additional bits generated by the first stage pre-decode mechanism 205 will typically be insufficient to store all of the necessary pre-decode information required by the processing circuitry. Accordingly, as shown in FIG. 3, when the contents of an instruction cache line within the unified cache 210 are retrieved for storage within a cache line of the further cache 240, those contents are passed through a further stage pre-decode mechanism 230 where a further pre-decode operation is performed on each partially pre-decoded instruction in order to generate a corresponding fully pre-decoded instruction for storing within the further cache 240. Typically, each cache line within the further cache will be sized appropriately to enable a cache line's worth of instruction data 252 to be stored, along with associated additional pre-decode bits 254, and parity data 256 to enable errors to be detected in the cache line's contents. In FIG. 3, it is assumed that each fully pre-decoded instruction consists of the original instruction, along with associated full pre-decode bits. However, in an alternative embodiment, the fully pre-decoded instruction may be a modified version of the original instruction, such that there is no clear delimitation between the instruction bits and the pre-decode information.

The exact form of the first stage pre-decode operation and the further stage pre-decode operation is a matter of design choice. For example, in one embodiment, there may be an arbitrary split of the necessary pre-decode steps between the first stage pre-decode mechanism 205 and the further pre-decode mechanism 230, so that collectively the first stage pre-decode mechanism 205 and the further stage pre-decode mechanism 230 perform the required pre-decode operations that would have previously been performed by a single pre-decode stage associated for example with the level one cache. Alternatively, the first stage pre-decode mechanism 205 may be arranged to generate some intermediate pre-decode information that then serves to improve the speed and/or efficiency of the further stage pre-decode operation performed by the further stage pre-decode mechanism 230, but with the information output by the first stage pre-decode mechanism not itself forming part of the final pre-decoded instruction.

Additionally, whilst in FIG. 3 a two-stage pre-decode mechanism is shown, it will be appreciated that the approach can be extended to incorporate additional stages of pre-decode in embodiments where the hierarchical cache structure includes more than two cache levels.

Figure 4:
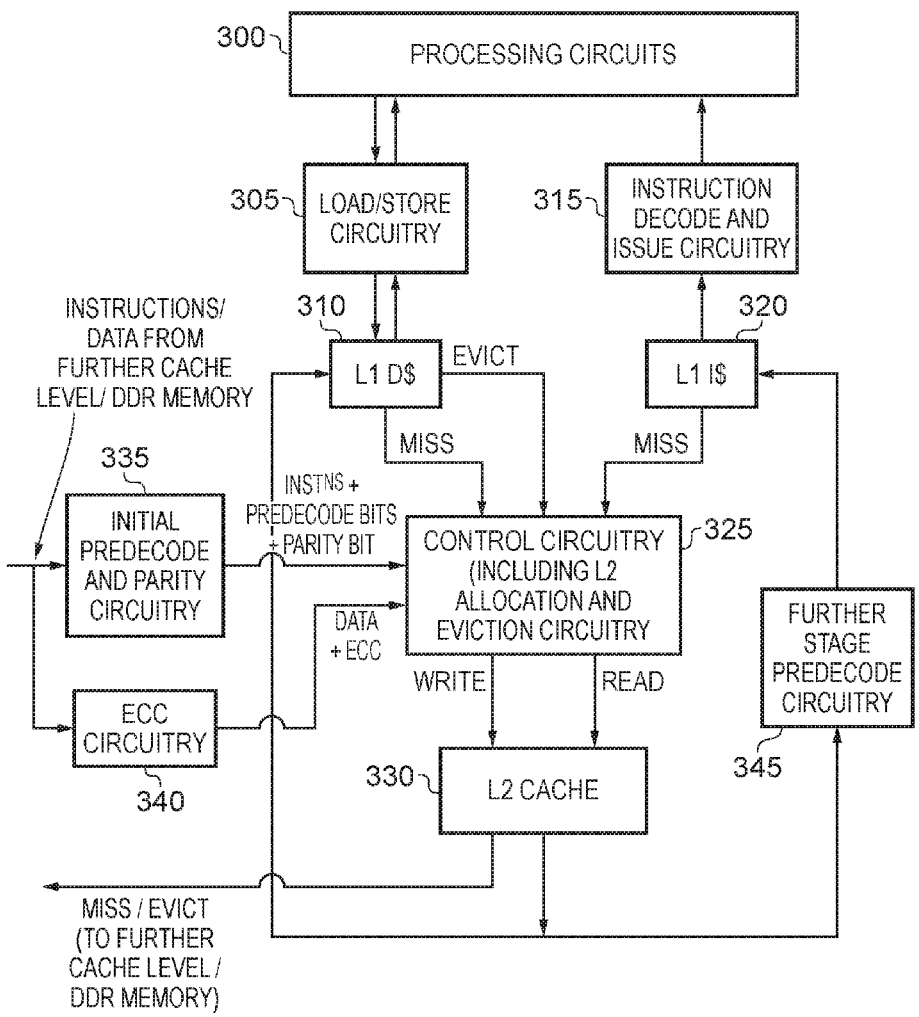
FIG. 4 is a block diagram illustrating in more detail components provided within the data processing apparatus in accordance with one embodiment.

FIG. 4 is a block diagram illustrating components provided within the data processing apparatus in accordance with one embodiment. The processing circuitry illustrated in FIGS. 1 and 2 consists of a plurality of processing circuits 300, along with associated load/store circuitry 305 for interfacing with the level one data cache 310, and associated instruction decode and issue circuitry 315 for interfacing with the level one instruction cache 320. The instruction decode and issue circuitry 315 will seek to retrieve instructions from the level one instruction cache 320 for issuing to the processing circuits. Some of those instructions will be load or store instructions used to cause the load/store circuitry 305 to load data from the level one data cache into internal working registers of the processing circuits or to store data from those internal registers back to the level one data cache 310.

Each access to the level one data cache 310 or the level one instruction cache 320 will have an address associated therewith, that address being used to identify whether the data value or instruction being requested is stored within the level one data cache or instruction cache, respectively. If not, this will result in the relevant level one cache 310, 320 issuing a cache miss indication to the control circuitry 325 associated with the level two cache 330 to cause a cache lookup operation to be performed within the level two cache 330 to determine whether the required data value or instruction is stored within the level two cache. If it is, then for a read request (all instruction requests issued by the instruction decode and issue circuitry 315 will be read requests), the required data value or instruction is read from the level two cache and returned to the level one data cache 310 or instruction cache 320. Any instructions returned to the level one instruction cache will already be partially pre-decoded, and will be routed to further stage pre-decode circuitry 345 where a further pre-decode operation will be performed in order to generate the fully pre-decoded instruction for storing within the level one instruction cache 320.

When a cache line's worth of data values are routed from the level two cache to the level one data cache 310 for storage therein, it will typically be necessary to determine a victim cache line whose current contents are to be overwritten by the newly provided data values. If those current contents are valid and dirty (i.e. are more up to date than the version stored in memory), then the victim cache line's current contents will need to be evicted to the level two cache 330, and accordingly an evict signal will be issued to the control circuitry 325 to instigate that eviction process. In contrast, when a new cache line's worth of instructions are routed to the level one instruction cache for storage therein, then a victim cache line will again need to be selected, but that victim cache line's current contents can merely be discarded, since they will always merely be a copy of instructions already stored within memory and accordingly can be refetched later as required. Accordingly, there is no eviction path from the level one instruction cache 320 to the control circuitry 325.

When a miss is detected in the level two cache 330, this will result in a request for data or instructions being issued to a lower cache level or main memory (such as DDR memory) and in due course this will result in a cache line's worth of instruction or data values being returned from that lower cache level or main memory. Any retrieved instructions will be passed through the initial pre-decode and parity circuitry 335 in order to generate the partially pre-decoded instructions and associated parity bit. Those partially pre-decoded instructions and associated parity bit will then be stored within an allocated cache line within the level two cache 330. As with the level one instruction cache, provided the allocated cache line is already storing instruction values, then the current contents can merely be overwritten by the newly received contents. However, if the allocated cache line currently stores data values, and those data values are valid and dirty, then they will need to be evicted from the level two cache to a lower cache level or main memory. The eviction and cache allocation processes can be performed using any known eviction and cache allocation policies, and accordingly will not be discussed further herein.

When a cache line's worth of data values are retrieved from the lower level of the cache hierarchy or main memory, they are routed via the ECC circuitry 340 in order to generate associated ECC data for the data values, with the output from the ECC circuitry then being provided to the control circuitry for allocation into a cache line of the level two cache 330. Wherever that new content is allocated to a cache line that currently stores valid and dirty data values, those contents will need to be evicted from the level two cache before being overwritten by the newly provided data.

Figure 5:
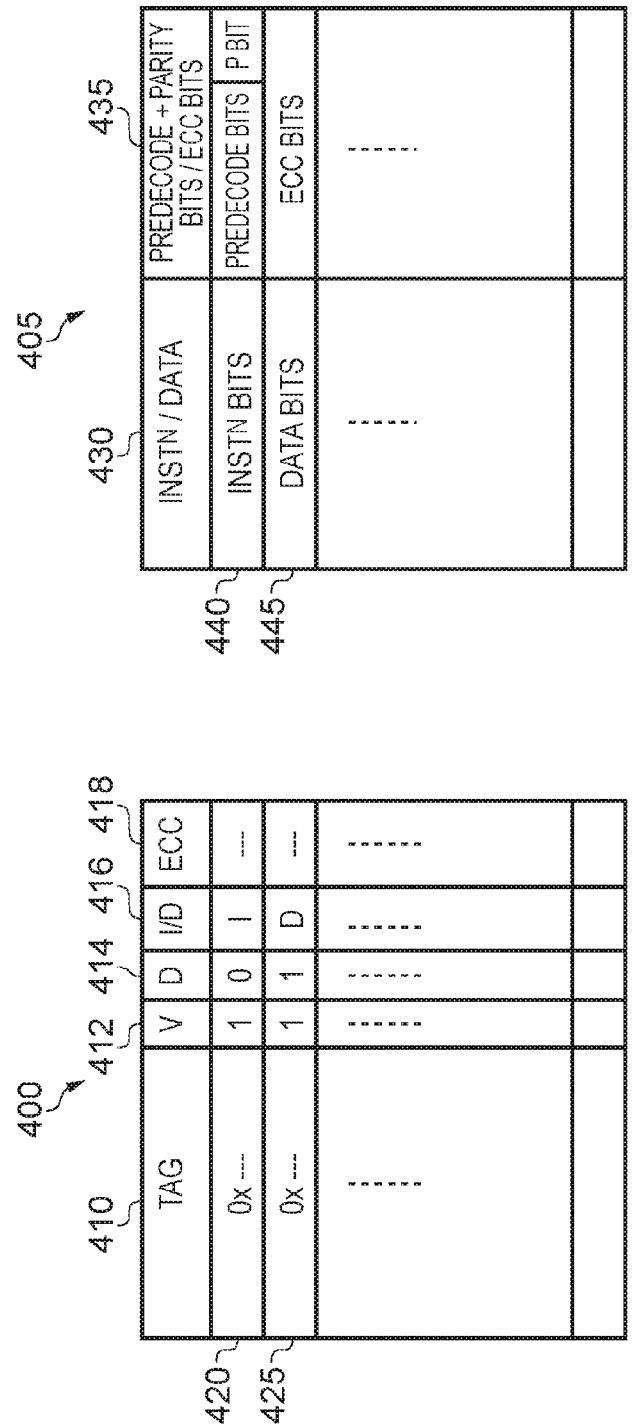
FIG. 5 schematically illustrates the contents of a tag RAM and data RAM provided within a unified cache in accordance with one embodiment.

FIG. 5 schematically illustrates the contents provided within a tag RAM 400 and associated data RAM 405 within the level two cache 330. The tag RAM 400 contains a plurality of tag entries, each tag entry having a tag portion 410 for storing a portion of an address associated with the instructions or data values stored within the corresponding cache line of the data RAM 405. It is this tag portion of the address that is referenced in order to determine whether there is a hit within the cache for a particular requested instruction or data value. The tag entry also includes a number of other fields, such as a valid field 412 for identifying whether the associated cache line stores valid data or instructions, a dirty field 414 used for any cache line storing data values in order to identify whether those data values are clean (i.e. are merely a copy of the data stored in a lower level of the cache hierarchy/main memory) or are dirty (i.e. are more up to date than the version stored in a lower level of the cache hierarchy or main memory). An instruction/data field 416 is also provided to identify whether any particular cache line stores instruction bits or data bits. Finally, an ECC field 418 is used to store ECC data used to detect and correct errors within the tag entry.

Within the data RAM, each cache line includes a portion 430 for storing instruction or data bits, and an associated information portion 435. For a cache line allocated as a data cache line, the associated information portion stores ECC bits used to detect and correct errors in the data cache line. However, as discussed earlier, for a cache line allocated as an instruction cache line, the associated information portion is used to store a parity bit, with the remaining space being used to store the additional pre-decode bits generated by the initial pre-decode operation.

As illustrated in FIG. 5 by way of example, the tag entry 420 identifies that the associated cache line 440 is used to store instruction bits, and is valid. The associated cache line 440 then stores the instruction bits and pre-decode bits collectively forming the partially pre-decoded instructions, along with a parity bit used to detect any errors in that cache line's contents. As also shown in FIG. 5, the tag entry 425 identifies that the corresponding cache line 445 is used to store data values which are both valid and dirty. The data values are stored within the portion 430 of the cache line, with the corresponding ECC bits then being stored in the associated information portion 435.

Figure 6:
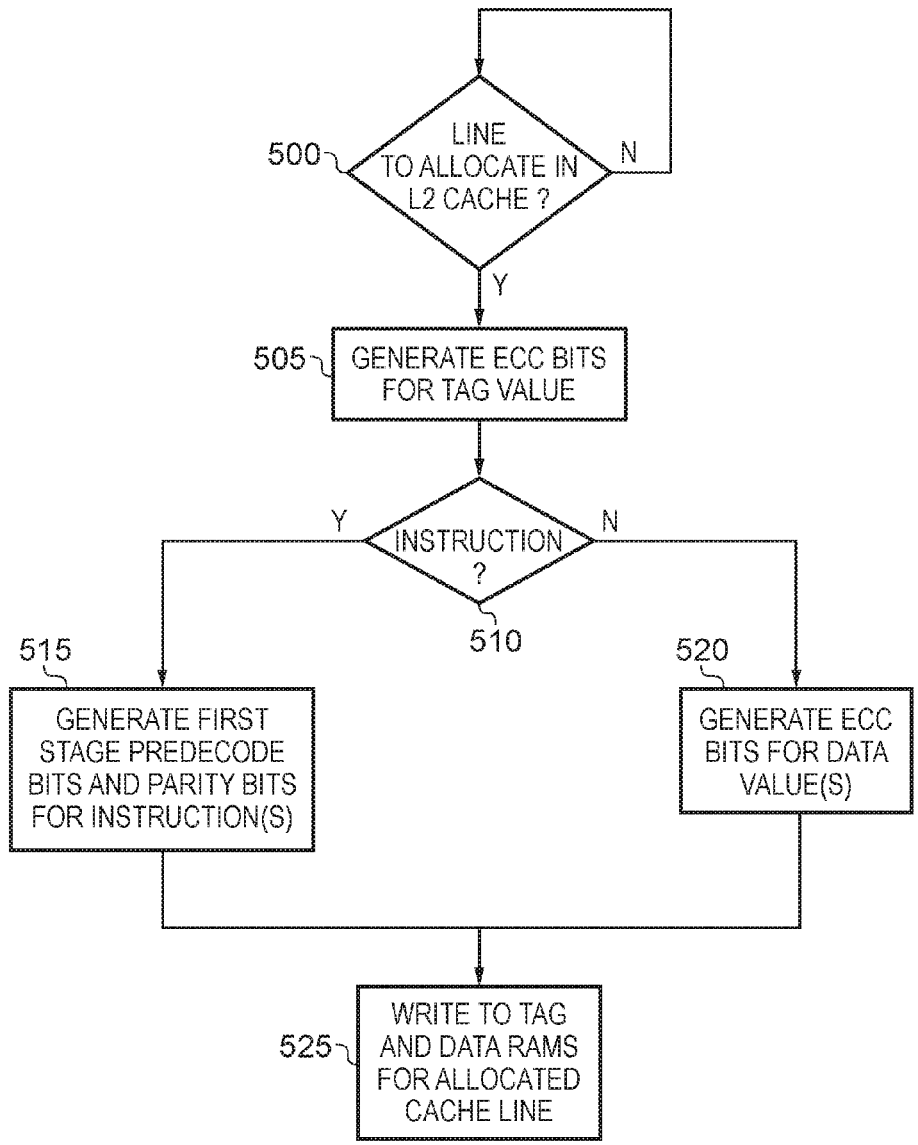
FIG. 6 is a flow diagram illustrating the steps performed when allocating instructions or data values into a cache line of the level two cache in accordance with one embodiment.

FIG. 6 is a flow diagram schematically illustrating the steps performed by the control circuitry 325 when allocating instructions or data into a cache line of the level two cache 330. At step 500, it is determined whether there is a cache line to be allocated within the level two cache, i.e. whether a new cache line's worth of instructions or data values has been received. If so, then the required ECC bits for the tag entry are generated at step 505. At step 510, it is determined whether the allocated cache line is to be used to store instructions or data values. If it is decided that the allocated cache line is to be used to store instructions, then at step 515 the first stage pre-decode bits and parity bit are generated for the received instructions, whereafter a write operation is performed to the tag and data RAMs for the allocated cache line at step 525. During this process, the valid bit will be set to identify that the cache line is valid, the dirty bit will be clear and the instruction/data field will be set to identify that the cache line stores instruction values.

If at step 510 it is determined that the allocated cache line is to be used to store data values, then at step 520 the ECC bits for those data values are generated, whereafter the tag and data RAMs are written to for the allocated cache line at step 525. During this process, the valid bit will be set to identify that the cache line is valid, the dirty bit will be either cleared or set, dependent on whether the data values are more up to date than those held in a lower level of the memory hierarchy/main memory, and the instruction/data field will be set to identify that the cache line stores data values.

Figure 7:
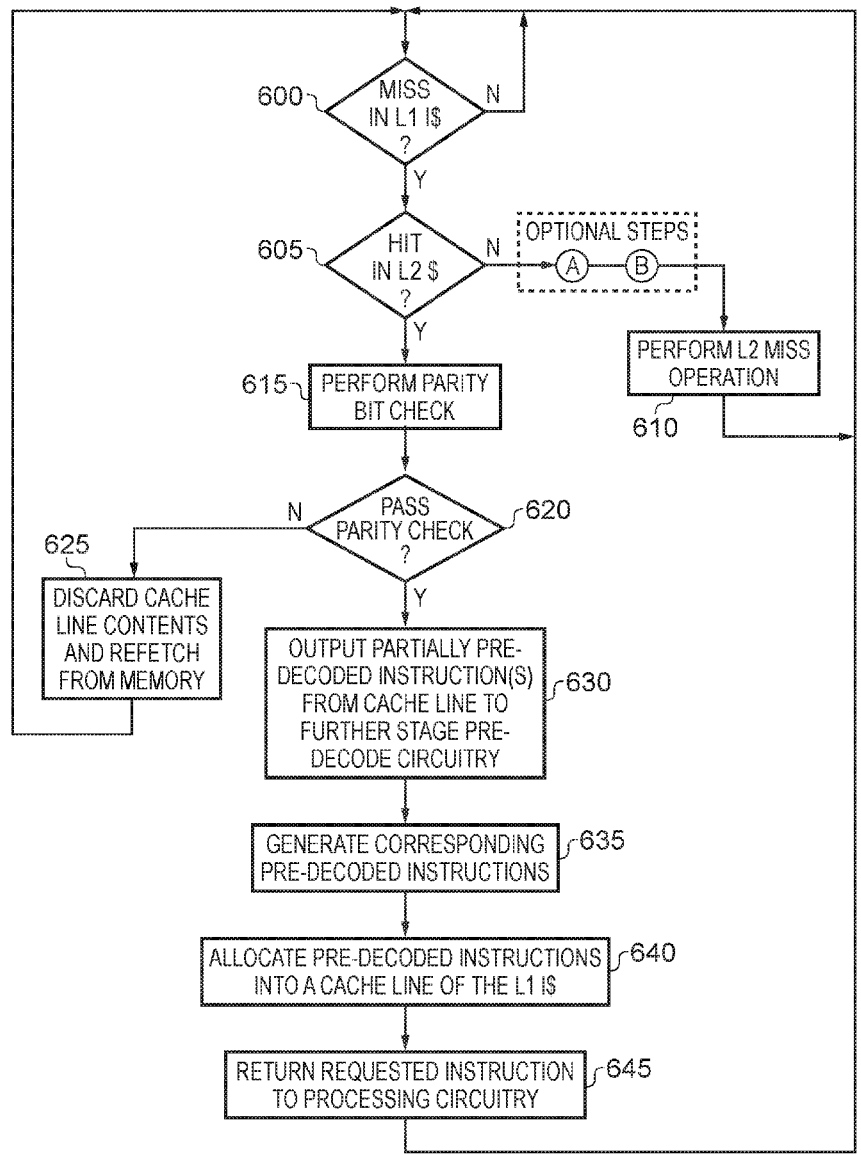
FIG. 7 is a flow diagram illustrating the steps performed on detection of a miss in the level one instruction cache of FIG. 4 in accordance with one embodiment.

FIG. 7 is a flow diagram illustrating the steps performed by the apparatus of FIG. 4 on the occurrence of a miss in the level one instruction cache 320. If a miss in the level one instruction cache is detected at step 600, it is then determined at step 605 whether there is a hit in the level two cache 330. If not, then in one embodiment the process proceeds directly to step 610, where a level two cache miss operation is performed via the control circuitry 325 in order to retrieve the required data into the level two cache, whereafter the process returns to step 600.

If a hit is detected in the level two cache at step 605, then the process proceeds to step 615 where a parity bit check is performed using the parity data stored in the hit cache line. It is then determined at step 620 if the parity check has passed, i.e. it has been determined that the content of the hit cache line is correct. If not, then the current cache line contents are discarded and refetched from memory at step 625, whereafter the process returns to step 600. Since the hit in the level two cache at step 605 will have been in respect of an instruction cache line, the current contents can safely be discarded and merely refetched, since the instruction cache line contents will only ever be a copy of the instructions stored in memory.

If the parity check is determined to have been passed at steps 620, then the process proceeds to step 630 where the partially pre-decoded instructions held within that cache line are output to the further stage pre-decode circuitry 345. Thereafter, at step 635, the further stage pre-decode circuitry generates the corresponding fully pre-decoded instructions, which are then at step 640 allocated into a cache line of the level one instruction cache 320. Thereafter, the requested instruction is returned to the processing circuitry at step 645. In particular, it will be returned to the instruction decode and issue circuitry 315 and will then be decoded and issued to an appropriate execution unit within the processing circuits 300. The process then returns to step 600.

In one embodiment, the instructions will not be modifiable, and accordingly if there is not a hit in the level two cache at step 605 it is appropriate to merely retrieve the required instruction(s) from a lower level of the cache hierarchy or main memory at step 610 as shown in FIG. 7. However, the techniques of the described embodiments can also be used in implementations that allow self modifying code. In particular, if the processing circuitry modifies an instruction, it typically writes that instruction out as a data value via the level one data cache 310. Subsequently that data will be evicted back to main memory where it will overwrite the previous value of the instruction, and accordingly when the instruction is subsequently requested, the modified instruction will be retrieved through the cache hierarchy into the level one instruction cache. However, it is possible that, if when performing a cache lookup in the level two cache in response to an instruction request, only the cache lines marked as instruction cache lines are reviewed, then a miss may be detected in the level two cache even though data representing the modified instruction is residing in a data cache line of the level two cache.

Figure 8:
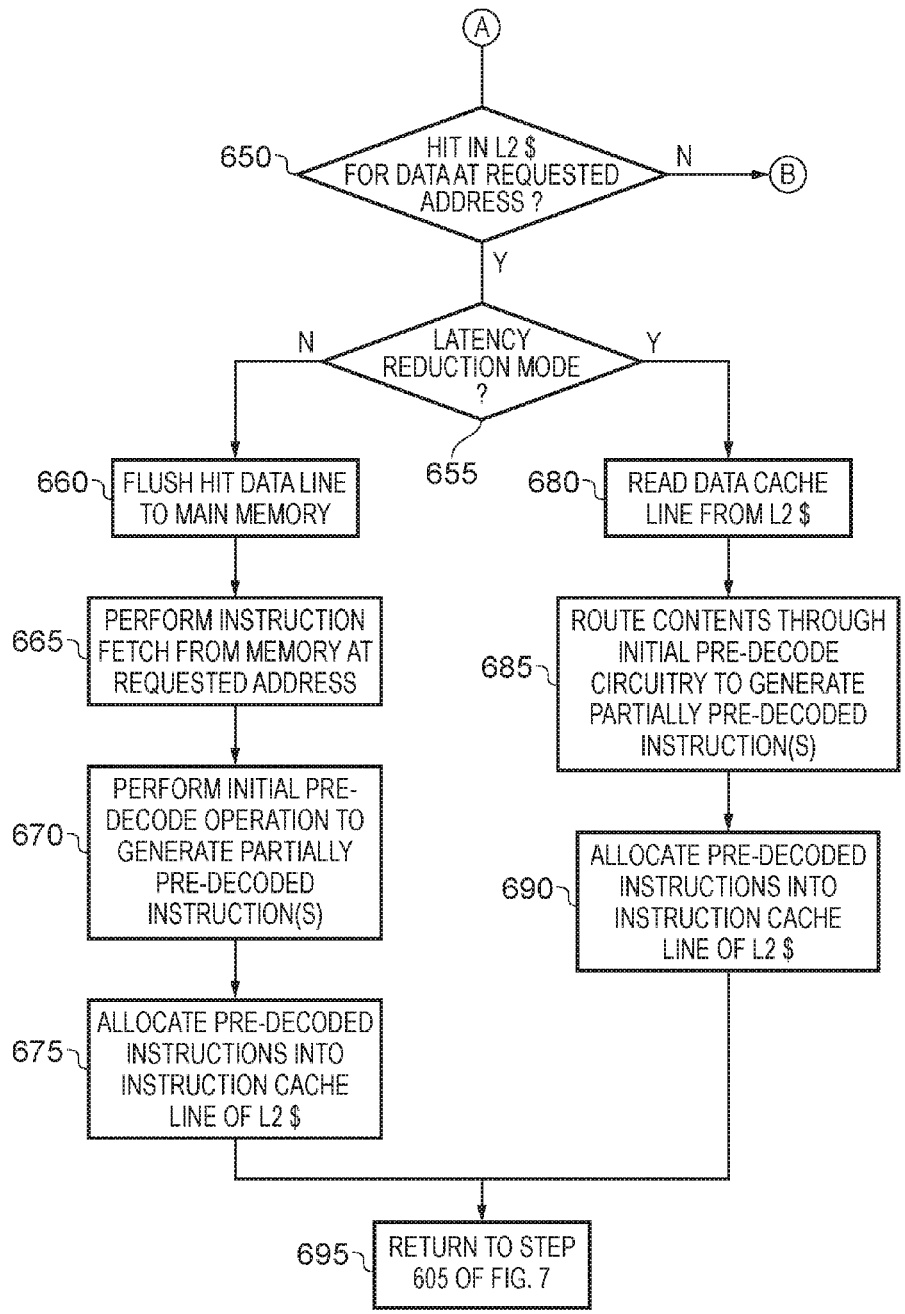
FIG. 8 is a flow diagram illustrating additional steps that may optionally be performed within the process of FIG. 7 in accordance with one embodiment.

FIG. 8 illustrates how the process of FIG. 7 may be modified to detect such situations and ensure that the correct instruction is retrieved for provision to the processing circuits 300. In particular, if at step 605 in FIG. 7 a hit is not detected in the level two instruction cache (i.e. none of the cache lines marked as instruction cache lines hold a copy of the requested instruction), then the process proceeds to step 650 where it is determined whether there is a hit in the level two cache for data at the requested address, i.e. whether any of the cache lines marked as data cache lines store data having an address matching the requested address. If not, then the process merely proceeds to step 610 of FIG. 7, where the earlier described process of FIG. 7 is then performed. However, if there is a hit at step 650, this indicates that the processing circuit has modified an instruction and written it out as data, and that that data is currently cached in the level two cache. In this situation, the process proceeds to step 655, where it is determined whether a latency reduction mode is being used or not. In particular, in one embodiment there are two possible ways in which this situation may be managed. The default mechanism is shown by the left hand side path through FIG. 8, whilst the right hand side path illustrates an alternative approach that can be used to reduce latency if desired.

Considering first the left hand side path, at step 660 the hit data cache line has its contents flushed to main memory, whereafter an instruction fetch is performed from memory at the requested address at step 665 in order to retrieve the modified instruction from memory. The cache line's worth of instruction values retrieved from memory will then be passed through the initial pre-decode and parity circuitry 335, where the initial pre-decode operation will be performed at step 670 in order to generate partially pre-decoded instructions. These partially pre-decoded instructions will then be allocated into an instruction cache line of the level two cache at step 675. Thereafter, the process will return to step 605 of FIG. 7 at step 695, at which point a hit in an instruction cache line of the level two cache will be detected.

Considering now the alternative approach shown by the right hand side path of FIG. 8, in this embodiment the hit data cache line's contents are not flushed to main memory, but instead they are read from the hit cache line at step 680 and then routed through the initial pre-decode circuitry 335 at step 685 to generate the partially pre-decoded instructions. Thereafter those partially pre-decoded instructions will be allocated into an instruction cache line of the level two cache at step 690. At this point, the instruction values will be replicated within two cache lines of the level two cache, one being a data cache line that will ultimately be evicted back to memory to update the instructions in memory, and the other being an instruction cache line holding the most up to date instructions in partially pre-decoded form.

Following step 690, the process returns to step 605 of FIG. 7, where there will now be a hit in an instruction cache line of the level two cache.

In the above example, it is assumed that the level 1 data cache 310 is arranged as a write through cache, at least in respect of the range of addresses associated with self modifying code, and accordingly whenever a modified instruction is output as data by the processing circuitry, any copy stored within the level 1 data cache 310 will also be stored within the level 2 cache 330. However, if in an alternative embodiment the level 1 data cache 310 is arranged as a write back cache for addresses associated with self modifying code (such that a copy of a modified instruction may be stored in the level 1 data cache but not yet stored in the level 2 cache), then the process of FIG. 8 can be modified so that at step 650 it is checked whether there is a hit in the level 1 data cache for data at the requested address, in addition to checking if there is a hit in the level 2 cache for data at the requested address. If there is a hit in the level 1 data cache, then the process of FIG. 8 is followed in respect of that hit cache line, and if the right-hand side of FIG. 8 is followed, then at step 680 the data is read from the hit cache line in the level 1 data cache.

Figure 9:
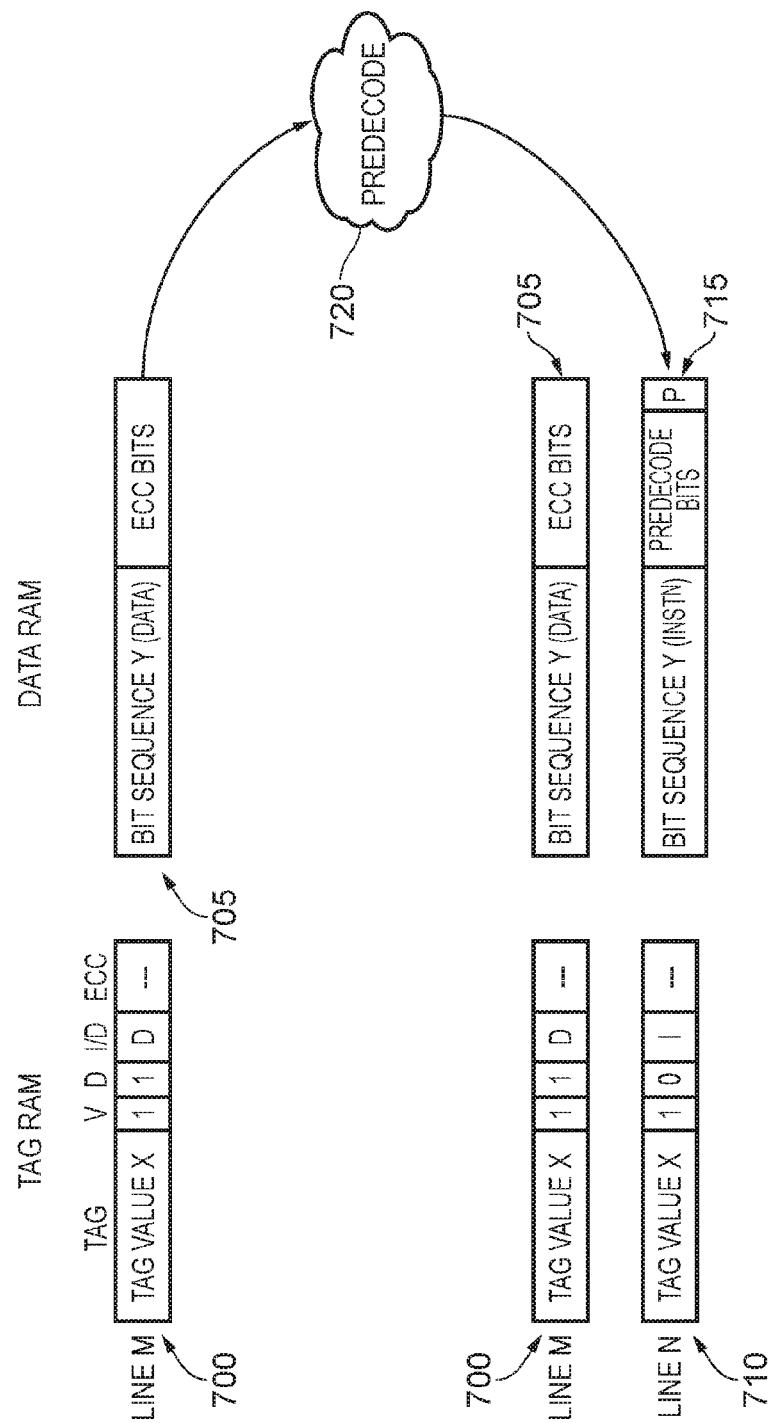
FIG. 9 is a diagram schematically illustrating the process performed when following the right hand path of FIG. 8 in accordance with one embodiment.

FIG. 9 schematically illustrates the mechanism of the right hand side path of FIG. 8. Initially, at step 650, a hit will be detected in the level two data cache line consisting of the tag RAM entry 700 and the data RAM entry 705. This data cache line is marked as valid and dirty, and hence indicates that the sequence of data bits stored in the data cache line is more up to date than that held in main memory. However, since a hit was detected at step 650, this means that the address value identified by the tag value X is actually an address value associated with instructions, and accordingly the bit sequence Y being treated as data actually represents one or more modified instructions.

In accordance with the right hand side path of FIG. 8, that bit sequence is read and routed through the pre-decode mechanism 720 in order to generate a cache line's worth of instruction data and associated pre-decode bits for storing in an allocated cache line of the level two cache. This cache line N will be a separate cache line to the cache line M storing the equivalent data, and in FIG. 9 is shown by the tag entry 710 and associated instruction cache line 715. The tag entry 710 will store exactly the same tag value X as the tag entry 700, but will be marked as an instruction cache line whose contents are valid and clean. The corresponding instruction cache line 715 then stores a number of partially pre-decoded instructions formed by the bit sequence Y and the pre-decode bits, along with a parity bit P.

It will be appreciated from the above described embodiments that such embodiments provide a multi-level pre-decode mechanism that provides a number of power and performance benefits when compared with known prior art techniques.

Although particular embodiments have been described herein, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. A data processing apparatus comprising:
processing circuitry configured to execute instructions fetched from memory in order to perform processing operations on data values;
a hierarchical cache structure configured to store the instructions fetched from said memory for access by the processing circuitry, the hierarchical cache structure comprising at least a unified cache configured to store both instructions and data values and a further cache coupled between the processing circuitry and the unified cache;
the unified cache having a plurality of cache lines, each cache line being identified as an instruction cache line or a data cache line and each cache line having an associated information portion;
each data cache line being configured to store at least one data value and the associated information portion being configured to store error correction code (ECC) data used for error detection and correction within that data cache line's stored content;
pre-decode circuitry configured, for each instruction cache line of the unified cache, to perform a first pre-decode operation on at least one received instruction for that instruction cache line in order to generate at least one partially pre-decoded instruction for storing in that instruction cache line, each at least one partially pre-decoded instruction having more bits than the corresponding received instruction and the unified cache being configured to use the instruction cache line in combination with its associated information portion to store said at least one partially pre-decoded instruction generated by the pre-decode circuitry; and
further pre-decode circuitry configured when the at least one partially pre-decoded instruction stored in one of said instruction cache lines is routed to the further cache for storage within at least one cache line of the further cache, to perform a further pre-decode operation on the at least one partially pre-decoded instruction in order to generate a corresponding at least one pre-decoded instruction for storage in the further cache.

2. A data processing apparatus as claimed in claim 1, wherein for each instruction cache line the associated information portion is configured to additionally store parity data used for error detection within that instruction cache line's stored content, the parity data comprising less bits than the ECC data.

3. A data processing apparatus as claimed in claim 2, wherein the parity data comprising m less bits than the ECC data, and the at least one partially pre-decoded instruction generated by the pre-decode circuitry has up to m more bits than the corresponding at least one instruction received by the pre-decode circuitry.

4. A data processing apparatus as claimed in claim 1, wherein the pre-decode circuitry is configured to modify at least one of the bit values of each received instruction when generating the corresponding partially pre-decoded instruction.

5. A data processing apparatus as claimed in claim 1, wherein the further pre-decode circuitry is configured to modify at least one of the bit values of each partially pre-decoded instruction when generating the corresponding pre-decoded instruction.

6. A data processing apparatus as claimed in claim 1, wherein the pre-decode circuitry is configured to generate first pre-decode information associated with each received instruction, such that each partially pre-decoded instruction generated by the pre-decode circuitry comprises the originally received instruction in combination with the first pre-decode information.

7. A data processing apparatus as claimed in claim 6, wherein the further pre-decode circuitry is configured, for each partially pre-decoded instruction, to generate further pre-decode information based on at least the first pre-decode information of that partially pre-decoded instruction.

8. A data processing apparatus as claimed in claim 7, wherein each pre-decoded instruction generated by the further pre-decode circuitry comprises the original received instruction and both the first pre-decode information and the further pre-decode information.

9. A data processing apparatus as claimed in claim 7, wherein the further pre-decode information generated by the further pre-decode circuitry replaces the first pre-decode information and each pre-decoded instruction generated by the further pre-decode circuitry comprises the original received instruction and the further pre-decode information.

10. A data processing apparatus as claimed in claim 1, wherein each cache line in the unified cache has an identifier field associated therewith whose value is set in order to identify whether the associated cache line is an instruction cache line or a data cache line.

11. A data processing apparatus as claimed in claim 1, wherein said unified cache is a level two cache, and said further cache is a level one cache.

12. A data processing apparatus as claimed in claim 1, wherein said further cache is configured to store instructions but not data values.

13. A data processing apparatus as claimed in claim 1, wherein:
each cache line in the unified cache has an address field associated therewith used to identify a memory address associated with the instructions or data values stored in that cache line;
at least some instructions are modifiable by the processing circuitry and output as data for storage in the memory;
each request for an instruction issued by the processing circuitry is accompanied by an address identifier used to identify the memory address of the instruction being requested;
the unified cache being configured, if no instruction cache line stores a copy of the requested instruction, to also check each data cache line to determine whether the address identifier for the requested instruction matches with the address field of any of the data cache lines, and upon such a match to perform a predetermined operation to output the requested instruction for provision to the processing circuitry.

14. A data processing apparatus as claimed in claim 13, wherein said predetermined operation comprises flushing from the unified cache the content of the data cache line producing said match, performing a linefill operation to cause that flushed content to be retrieved via the pre-decode circuitry and the resultant generated at least one partially pre-decoded instruction to be stored into one of said instruction cache lines, and outputting the partially pre-decoded instruction corresponding to the requested instruction.

15. A data processing apparatus as claimed in claim 13, wherein said predetermined operation comprises reading from the unified cache the content of the data cache line producing said match, routing that content to the pre-decode circuitry to cause the first pre-decode operation to be applied to that content, storing the resultant at least one partially pre-decoded instruction generated by the pre-decode circuitry in one of said instruction cache lines, and outputting the partially pre-decoded instruction corresponding to the requested instruction.

16. A method of pre-decoding instructions within a data processing apparatus having processing circuitry for executing instructions fetched from memory in order to perform processing operations on data values, and a hierarchical cache structure for storing the instructions fetched from said memory for access by the processing circuitry, the hierarchical cache structure comprising at least a unified cache configured to store both instructions and data values and a further cache coupled between the processing circuitry and the unified cache, the unified cache having a plurality of cache lines, each cache line being identified as an instruction cache line or a data cache line and each cache line having an associated information portion, the method comprising:
storing within each data cache line at least one data value and storing within the associated information portion error correction code (ECC) data used for error detection and correction within that data cache line's stored content;
employing pre-decode circuitry, for each instruction cache line of the unified cache, to perform a first pre-decode operation on at least one received instruction for that instruction cache line in order to generate at least one partially pre-decoded instruction for storing in that instruction cache line, each at least one partially pre-decoded instruction having more bits than the corresponding received instruction and the unified cache being configured to use the instruction cache line in combination with its associated information portion to store said at least one partially pre-decoded instruction generated by the pre-decode circuitry; and
employing further pre-decode circuitry, when the at least one partially pre-decoded instruction stored in one of said instruction cache lines is routed to the further cache for storage within at least one cache line of the further cache, to perform a further pre-decode operation on the at least one partially pre-decoded instruction in order to generate a corresponding at least one pre-decoded instruction for storage in the further cache.

17. A data processing apparatus comprising:
processing means for executing instructions fetched from memory in order to perform processing operations on data values;
a hierarchical cache structure means for storing the instructions fetched from said memory for access by the processing means, the hierarchical cache structure means comprising at least a unified cache means for storing both instructions and data values and a further cache means coupled between the processing means and the unified cache means;
the unified cache means having a plurality of cache lines, each cache line being identified as an instruction cache line or a data cache line and each cache line having an associated information portion;
each data cache line for storing at least one data value and the associated information portion for storing error correction code (ECC) data used for error detection and correction within that data cache line's stored content;
pre-decode means for performing, for each instruction cache line of the unified cache means, a first pre-decode operation on at least one received instruction for that instruction cache line in order to generate at least one partially pre-decoded instruction for storing in that instruction cache line, each at least one partially pre-decoded instruction having more bits than the corresponding received instruction and the unified cache means using the instruction cache line in combination with its associated information portion to store said at least one partially pre-decoded instruction generated by the pre-decode means; and further pre-decode means for performing, when the at least one partially pre-decoded instruction stored in one of said instruction cache lines is routed to the further cache means for storage within at least one cache line of the further cache means, a further pre-decode operation on the at least one partially pre-decoded instruction in order to generate a corresponding at least one pre-decoded instruction for storage in the further cache means.

* * * * *